Dec. 27, 1927.
W. LUXMORE
1,654,005
WINDSHIELD CLEANER
Filed June 28, 1926
2 Sheets-Sheet 1
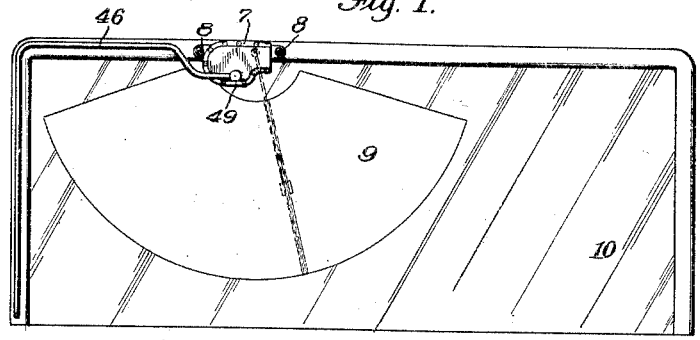
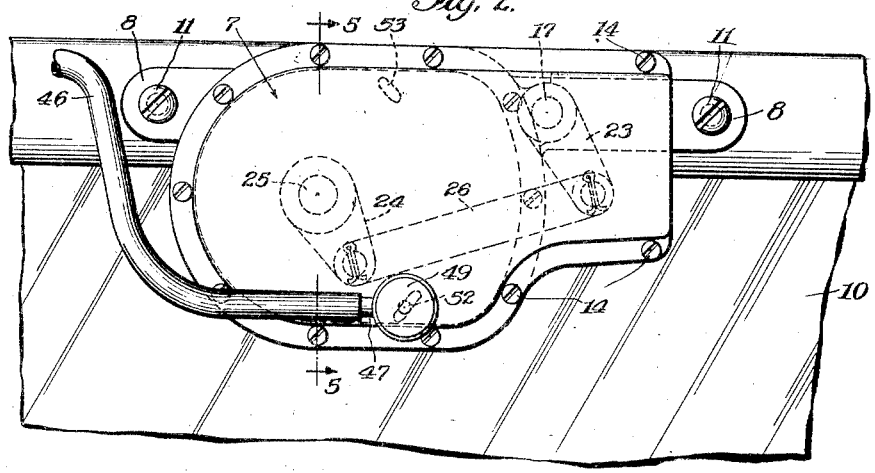
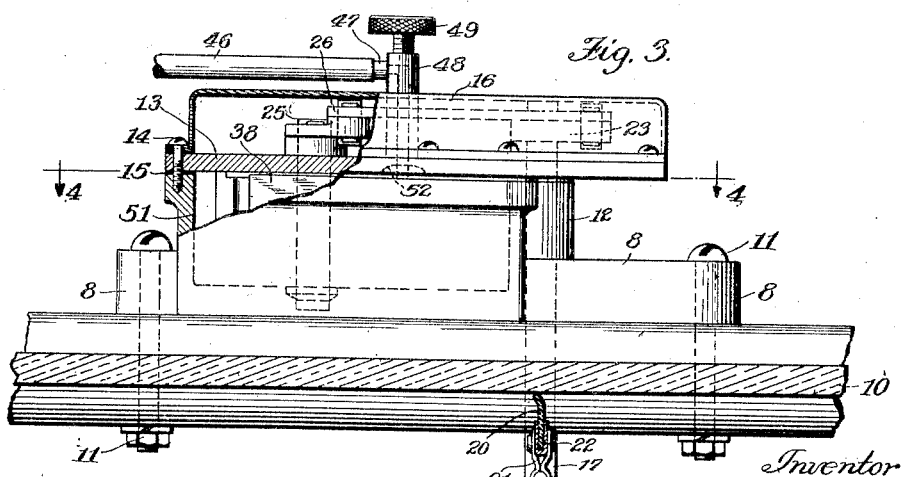
Inventor
William Luxmore
By Williams, Bradbury,
McCaleb & Hinkle, Attys.

Dec. 27, 1927.  
W. LUXMORE  
1,654,005  
WINDSHIELD CLEANER  
Filed June 28, 1926  
2 Sheets-Sheet 2

Inventor  
William Luxmore  
By Williams, Bradbury,  
McCaleb & Hinkle  
Attys.

Patented Dec. 27, 1927.

1,654,005

UNITED STATES PATENT OFFICE.

WILLIAM LUXMORE, OF CHICAGO, ILLINOIS.

WINDSHIELD CLEANER.

Application filed June 28, 1926. Serial No. 118,977.

My invention relates to windshield cleaners, and more particularly to its operating motor.

It is an object of my invention to provide an improved power means for use in the operation of automatic windshield cleaners.

A further object is to provide an improved rotary suction motor.

Figure 4:
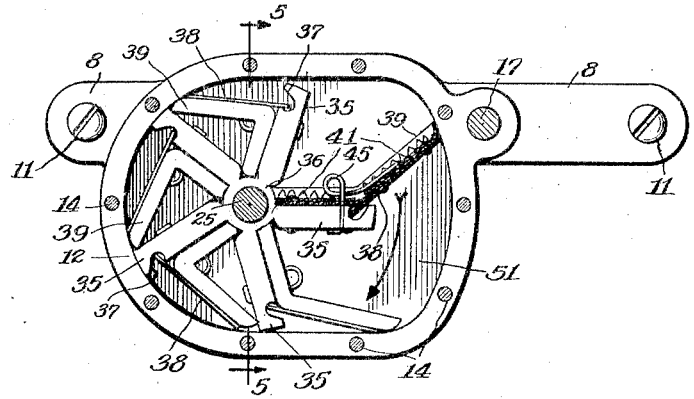
Figure 5:
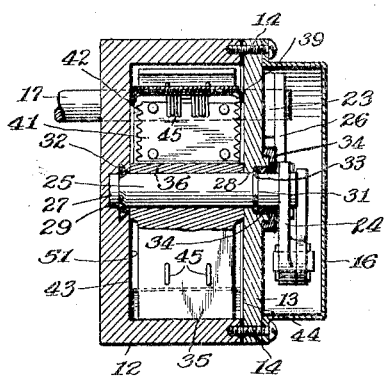
Figure 6:
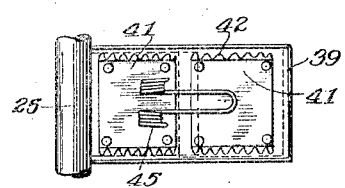

Other objects will appear from the following description, reference being had to the accompanying drawings, in which Figure 1 is an elevation of the automobile windshield, showing my improved wiper installed thereon, Figure 2 is an enlarged elevational view of the motor and operating means, Figure 3 is a fragmentary bottom plan view, Figure 4 is a sectional view of the suction motor, taken on the line 4—4 of Fig. 3, Figure 5 is a vertical sectional view taken on the plane represented by the line 5—5 of Figure 4; and Figure 6 is a detailed view showing one of the rotor blades of the suction motor.

As shown in Figures 1, 2 and 3, the windshield cleaner comprises a housing 7 having fastening lugs 8 formed integral therewith, for securing the housing to frame 9 of the windshield 10 through the use of bolts 11 passing through these brackets 8. Housing 7 includes a main body casting 12, covered by a plate 13 which is secured to the body casting by screws 14, a suitable packing 15 being interposed between the plate and the body casting to make an air-tight joint. Screws 14 also hold a sheet metal casing 16 covering the operating parts, as will later be described. The squeegee rock shaft 17 is suitably journaled in the body casting 12 and extends beyond the outer surface of the windshield 10. At its outer end it carries an adjustable rod 19 (Fig. 3) to which the wiper or squeegee 20 is attached by a clamp 21, the rubber portion of the squeegee being reinforced by a suitable metallic backing channel 22. The other end of the rock shaft 17 has an arm 23 pinned thereto. The outer end of this arm is operatively connected to an arm 24, which is pinned to the rotor shaft 25, by means of a link 26, suitable pivot pins being provided to make the pivotal connections. The arm 23 is longer than the arm 24 so that upon rotation of the shaft 25, the arm 24 and consequently the rock shaft 17 will oscillate through an angle of slightly less than 180°.

The shaft 25 is rotatable in a socket bearing 27 (Fig. 5) formed in the body casting 12 and also in a suitable bearing 28 formed in the cover plate 13. The shaft 25 has annular grooves 29 and 31 cut adjacent its bearing portions. These annular grooves are adapted to receive rings 32, 33 of suitable flexible elastic packing material, an inwardly flanged gland 34 being screw-threaded adjacent the bearing portion 28 so as to hold the ring 33 in position in its groove 31. The elastic packing rings are maintained in their grooves by their own resiliency. A hub 36 keyed to, or formed integral with the shaft 25, carries a plurality of blades 35 which extend outwardly in planes tangential to the periphery of the hub portion. Each of the blades 35 has a transverse groove 37 formed near its end, the groove forming a socket or bearing for a plate 38. Secured to each of the blades 35 and to its connected plate 38 is a rectangular cupped washer 39 made of leather or similar material. This cupped washer is fastened to the plate 38 and to the blade 35 by sheets 41 riveted to the blades 35 and plate 38 and forms a hinge between these parts. The edges of the sheets 41 may be serrated, as shown at 42, so as to resiliently engage the cupped portion of the cupped washer 39 and force it into contact with the flat surface 43 of the body casting and the inner surface 44 of the cover plate 13. The plate 38 and the parts attached thereto normally tend to lie in the plane of the blades 35, being resiliently urged toward such position by a double coil spring 45, which is anchored in the blade 35 and whose hairpin-shaped central portion engages the backing sheet 41 which is riveted to the plate 38. The usual rubber tubing 46 (Figs. 1, 2 and 3) is employed to transmit the suction from the intake manifold or other suitable source on the engine to the suction motor, the connection being made to a nipple 47 which may be screwed into, or formed integral with, the valve body 48. The valve body may be formed integral with the cover plate 13, or may be screwed into the plate or connected in any other suitable manner. The suction may be controlled by means of a blunt needle valve (not shown), rotatable to and from its seat by means of the knurled thumb screw 49. An opening 52 from the valve body 48 into rotor chamber 51 is elongated as shown in dotted lines in Fig. 2, being of sufficient length so that the opening will never be entirely covered over by one of the cup leathers 39. The air is admitted to the chamber 51 through an opening 53 in the cover plate 13. There is sufficient leakage between the casing 16 and the cover plate 13 so that it is not necessary to provide openings therein, although if desired, suitable perforations may be made along the lower side of the casing.

When the suction is applied to the motor, the valve 49 being opened, the partial vacuum caused will create a difference in air pressure upon the upper and lower surfaces of the cup leather 39 which happens at that moment to lie between the openings 52 and 53. This difference in pressure will cause the rotor to turn, and movement thereof will be continued as each of the cup leathers successively comes to the position between the air inlet opening 53 and the air suction opening 52. It will be apparent that the effective force tending to rotate the rotor may be computed by multiplying the difference in pressure on the opposite sides of the cup leather 39 by the area of the cup leather less the area of the blade 35.

The motor of my invention is capable of delivering more than sufficient power necessary to oscillate the squeegee and due to its construction it has no dead centers and will always operate immediately upon opening the valve which permits the suction from the intake manifold to be communicated to the chamber 51. Because of its continuous motion, the motor will operate under considerably lower pressure differences than is feasible in a reciprocating type of suction motor.

It will be noted that the shape of the housing is such that each plate 38 will lie very nearly in the plane of its blade 35 at the beginning of the working portion of its rotative cycle and will be retained in this position relative to its blade due to the fact that the casing's inner surface which limits the relative movement of the plate relative to the blade conforms to the surface of a cylinder having an axis concentric with that of the shaft 25. Each of the plates thus exerts very nearly its maximum rotative moment upon the shaft 25, throughout the working portion of the cycle of the plates.

Leakage of the air past the hub portion and around the socket bearing of the shaft is prevented by the packing rings 31 and 32, it being apparent that the suction caused by a tendency to leak would immediately draw these ring packings closely to their seats and thus seal the bearings of the shaft. These rings normally fit very loosely against their adjacent bearing surfaces and do not materially increase the friction.

While I have shown and described but one embodiment of my invention, it will be apparent to those skilled in the art that variations in the construction may be made without department from the principles of my invention. I therefore do not wish to be limited to the specific construction shown, but what I claim and desire to secure by Letters Patent is:

1. In a fluid pressure motor, the combination of a housing, a rotor mounted in said housing, a plurality of blades carried by said rotor, a plurality of plates, cupped flexible washers secured to and forming hinges between said blades and plates, means permitting the extension of said plates relative to said blades throughout a portion of their rotative cycle, and means for creating a suction in a portion of said housing whereby the plate in extended position is subjected to pressure differences causing it to exert a rotative force upon said rotor.

2. In a device of the class described, the combination of an elongated housing, a rotor shaft mounted therein, a plurality of blades carried by said rotor, plates pivotally mounted in sockets near the extremities of said blades, a flexible cupped washer joining said plates and blades, resilient means tending to extend said plates in alignment with said blades, and means for producing different fluid pressures upon opposite sides of said plates to cause rotation of said rotor shaft and blades.

3. In a device of the class described, the combination of a housing, a shaft, a rotor having a plurality of radial blades rotatably carried by said housing, said blades having a transverse groove at their ends, pivot plates having their edges in said grooves, flexible cupped washers joining said plates and blades, and means for producing different fluid pressures on opposite sides of said plates to cause rotation of said rotor shaft and blades.

4. In a device of the class described, the combination of a housing, a shaft, a rotor having a plurality of radial blades rotatably carried by said housing, said blades having a transverse groove at their ends, pivot plates having their edges in said grooves, flexible cupped washers joining said plates and blades, fastening plates within said cupped washers, means to clamp portions of said washers between said blades and fastening plates and between said pivot plates and fastening plates, and means for producing different fluid pressures on opposite sides of said plates to cause rotation of said rotor shaft and blades.

5. In a device of the class described, the combination of a housing, a shaft, a rotor having a plurality of radial blades rotatably carried by said housing, said blades having a transverse groove at their ends, pivot plates having their edges in said grooves, flexible cupped washers joining said plates and blades, reinforcing plates within said cupped washers, having resilient fingers in engagement with the edges of said washers, and means for producing different fluid pressures on opposite sides of said plates to cause rotation of said rotor shaft and blades.

6. In a device of the class described, the combination of a housing, a shaft, a rotor having a plurality of radial blades rotatably carried by said housing, said blades having a transverse groove at their ends, pivot plates having their edges in said grooves, flexible cupped washers joining said plates and blades, reinforcing plates within said cupped washers, having resilient fingers in engagement with the edges of said washers, and double springs having coiled portions lying on said reinforcing plates, ends hooked through said blades and a yoke pressing said cupped washer against the walls of said casing.

7. In a device of the class described, the combination of a housing, a shaft, a rotor having a plurality of radial blades rotatably carried by said housing, said blades having a transverse groove at their ends, pivot plates having their edges in said grooves, flexible cupped washers joining said plates and blades, reinforcing plates within said cupped washers, having resilient fingers in engagement with the edges of said washers, compressible packing surrounding the ends of said shaft, and means for producing different fluid pressures on opposite sides of said plates to cause rotation of said rotor shaft and blades.

In witness whereof, I hereunto subscribe my name this 21st day of June, 1926.

WILLIAM LUXMORE.